(12) United States Patent
Faverio, IV et al.

(10) Patent No.: US 9,371,941 B1
(45) Date of Patent: Jun. 21, 2016

(54) EXTERIOR DUCTWORK SYSTEM

(71) Applicant: PTM MANUFACTURING, LLC, Newark, DE (US)

(72) Inventors: Louis Peter Faverio, IV, Bear, DE (US); Jerry Lee Arms, Newark, DE (US)

(73) Assignee: PTM Manufacturing, LLC, Newark, DE (US)

( * ) Notice: Subject to any disclaimer, the term of this patent is extended or adjusted under 35 U.S.C. 154(b) by 248 days.

(21) Appl. No.: 14/072,932

(22) Filed: Nov. 6, 2013

(51) Int. Cl.
*F16L 9/14* (2006.01)
(52) U.S. Cl.
CPC .......................................... *F16L 9/14* (2013.01)
(58) Field of Classification Search
CPC ........................................................ F16L 9/14
USPC ......................................... 138/149, 155, 109
See application file for complete search history.

(56) References Cited

U.S. PATENT DOCUMENTS

| | | | | |
|---|---|---|---|---|
| 2,451,145 A * | 10/1948 | Baker | .................... | F16L 59/147 138/149 |
| 2,489,048 A * | 11/1949 | Rinehart | .................... | F16L 9/21 138/149 |
| 2,857,931 A * | 10/1958 | Lawton | ................. | F16L 59/029 138/149 |
| 3,938,694 A * | 2/1976 | Archuleta | ............. | F24F 5/0035 138/147 |
| 5,219,403 A * | 6/1993 | Murphy | ................... | F16L 9/003 137/561 A |
| 5,450,879 A * | 9/1995 | Toben | ................. | F24F 13/0209 138/109 |
| 5,975,146 A * | 11/1999 | Lardillat | ............... | F16L 59/147 138/149 |
| 6,231,704 B1 * | 5/2001 | Carpinetti | ............... | F16L 9/003 138/149 |
| 6,360,783 B2 | 3/2002 | Faverio, IV et al. | | |
| 6,743,483 B2 | 6/2004 | Rochefort et al. | | |
| 7,044,171 B2 | 5/2006 | Betley et al. | | |
| 7,195,290 B2 * | 3/2007 | Duffy | ...................... | F16L 23/14 138/109 |
| 7,699,078 B1 | 4/2010 | Husmann, Jr. | | |
| 8,028,483 B2 | 10/2011 | Carolan | | |
| 8,316,603 B2 | 11/2012 | Flynn et al. | | |
| 2003/0051764 A1 * | 3/2003 | Jungers | ................... | B29C 41/04 138/149 |
| 2010/0024911 A1 * | 2/2010 | Menardo | ............... | F16L 59/141 138/112 |
| 2015/0101697 A1 * | 4/2015 | Duffy | .................. | F24F 13/0209 138/149 |

* cited by examiner

*Primary Examiner* — James Hook
(74) *Attorney, Agent, or Firm* — Panitch Schwarze Belisario & Nadel LLP

(57) ABSTRACT

An insulated ductwork system particularly adapted for exterior use joins together pre-assembled air circulation duct sections that each have a ductwork passageway that is formed solely with insulation panels of foam insulation material disposed between foil sheets that are in turn covered by additional insulation material and an outer protective jacket to seal the ductwork from weather effects. The air circulation duct sections are used without traditional metal ductwork forming any part of the air circulation duct. Receiving flanges extend from the ends of each air circulation duct section and the duct sections are joined together in abutting relation with at least one slidably engageable sleeve that engages the flanges. A filler insulation is disposed over the sleeve. A closure band is disposed over the filler insulation and joined to exterior surfaces of the air circulation duct sections.

16 Claims, 5 Drawing Sheets

EXTERIOR DUCTWORK SYSTEM

BACKGROUND OF THE INVENTION

1. Field of the Invention

The invention relates to a duct work design particularly suitable for exterior ductwork systems, in which the ductwork passageway is formed solely with insulation panels that are in turn covered by an outer protective jacket to seal the ductwork from weather effects.

2. Background

Heating, ventilation and air conditioning systems use ventilation air ducts installed throughout a building to supply conditioned air to a room through outlet vents, and ducts to remove air through return grilles. Galvanized mild steel is the standard and most common material used in fabricating ductwork. For insulation purposes, metal ducts may be lined with faced fiber glass blanket (duct liner) or wrapped externally with fiber glass blankets (duct wrap), or lined or wrapped with foams or other insulative materials.

Traditionally, air ductwork was made of sheet metal which was installed first and then lagged with insulation as a secondary operation. Aluminum tape was applied to all seams where the external surface of the aluminum foil had been cut. Internal joints then could be sealed with sealant. The traditional ductwork installation was highly labor intensive.

When used outside, the ductwork and insulation combined therewith require a weather tight seal. U.S. Pat. No. 6,360,783 discloses one improved duct work system in which insulating panels are applied externally around the metal duct. The insulating panels comprise two adjacent insulation panels. Then, an embossed metal layer extends over the outer surfaces of the outermost insulation panel. Adjacent insulating panels are joined by fasteners. The embossed metal layers overlap at some edges and are further joined by grout or adhesive to create moisture barriers at their overlapping edges and interfaces.

Ducting systems that use insulation panels to form the ductwork passageway without an inner sheet metal duct have been proposed for indoor use. Such systems lack stability and weather resistance necessary for exterior ductwork systems. Accordingly, improvements to ductwork systems and more weather-robust exterior ductwork systems continue to be sought.

SUMMARY OF THE INVENTION

The present invention in a first aspect is directed to an air circulation duct section that has an inner duct air passageway formed with a first insulation material having a top wall, a bottom wall and two opposed sidewalls. The first insulation material is not a traditional sheet metal duct. Solid insulation is joined to the outer surfaces of the first insulation material of the inner duct air passageway. A jacket is joined to the outer surfaces of the solid insulation. The jacket may be formed from a series of sheet sections, such as aluminum sheet, with at least some of the sections having angled flange edges that overlap adjacent jacket sections. The flange edges may be joined with fasteners to the overlapped side edges of adjacent jacket sections. A sealant or grout may be applied to the flange edges, and may be held within ribs or channels formed in the flange edges.

In one embodiment, the first insulation material of the inner duct passageway may be a foam insulation disposed between foil sheets.

Alternatively, in another embodiment, the first insulation material may include multiple insulating panels adhered or laminated together.

Two or more air circulation duct sections may be joined together in end to end relation in a series to form an insulated ductwork system. The joint at which two air circulation duct sections meet may be covered by filler insulation and in turn by a closure band disposed over the filler insulation and the joint. The closure band may be joined to the jackets of the air circulation duct sections with adhesive tape, such as butyl gasket tape, in combination with fasteners, such as screws. In addition, the closure band may define ribs or channels at or near its side edges to receive sealant or grout to adhere longitudinal edges of the closure band to the jackets of the air circulation duct sections.

Advantages of the air circulation duct sections and ductwork system will appear from the drawings and following description.

BRIEF DESCRIPTION OF THE DRAWINGS

The invention described above will be explained in greater detail below on the basis of embodiments and with reference to the accompanying drawings in which.

DETAILED DESCRIPTION OF THE PREFERRED EMBODIMENTS

Figure 1:
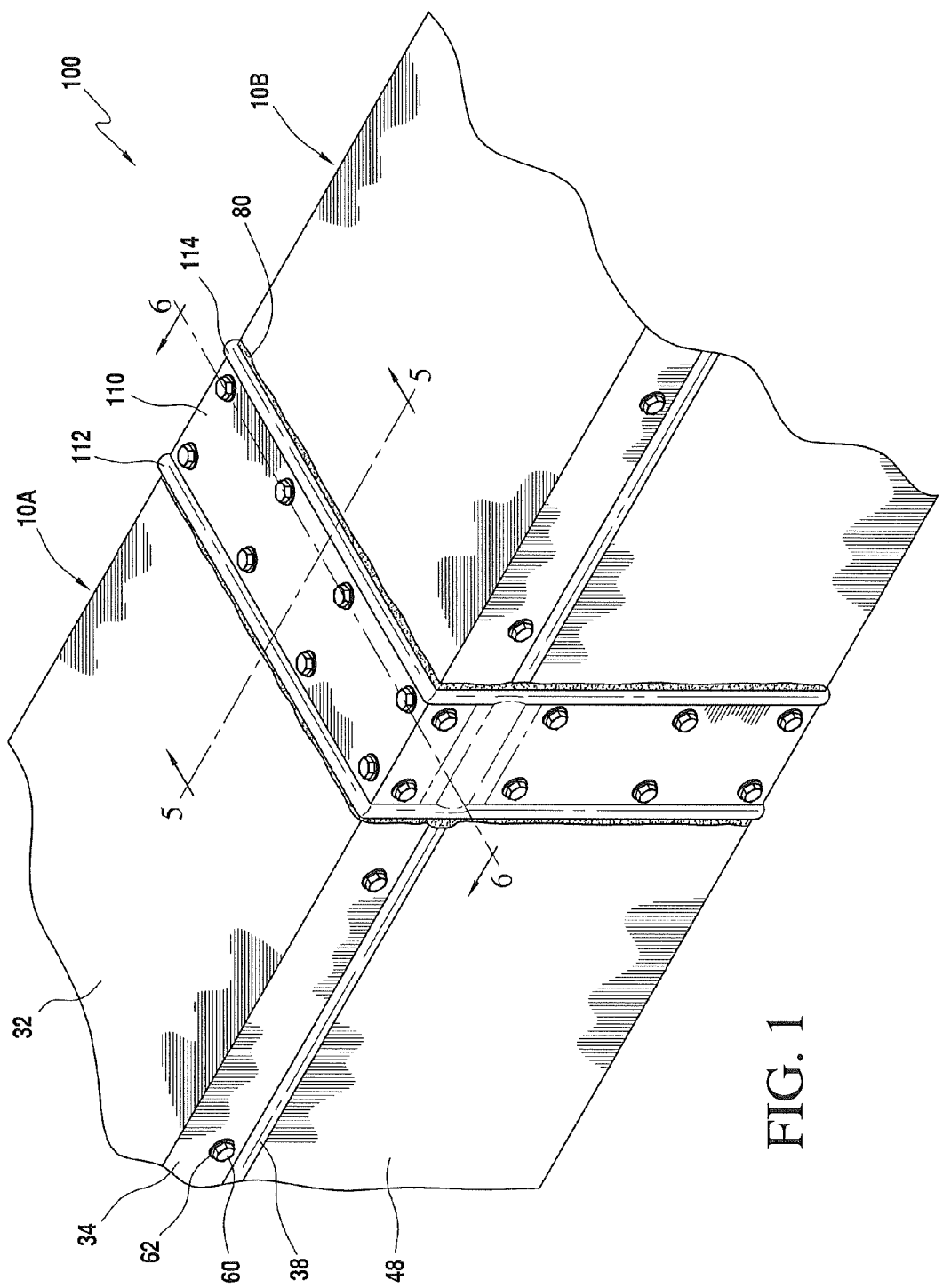
FIG. 1 is a left front perspective view broken away showing one embodiment of a section of an air circulation duct system according to the invention in which two air circulation duct sections are joined together.
Figure 2:
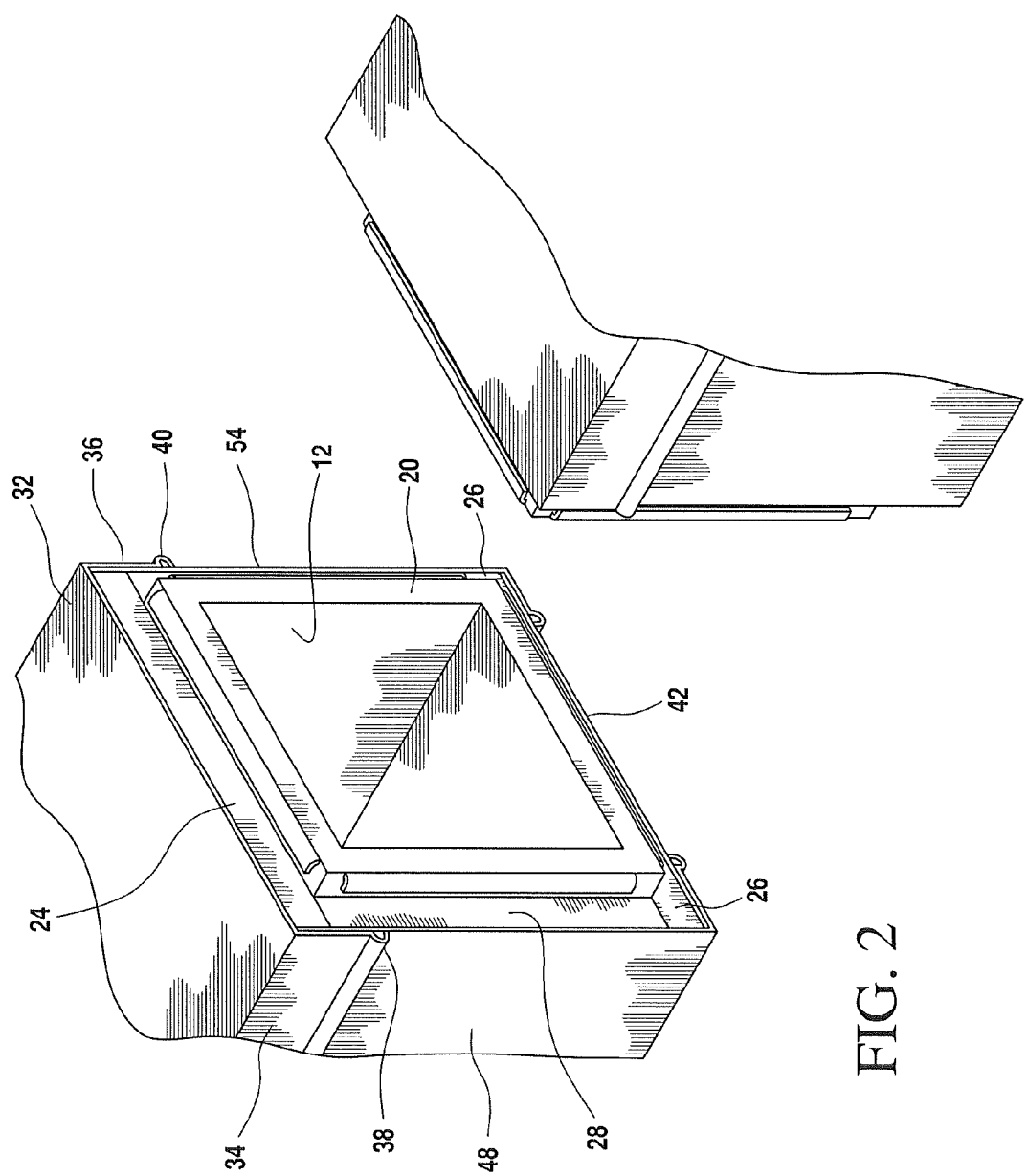
FIG. 2 shows a left front perspective view broken away showing two air circulation duct sections according to the invention prior to joining them together.
Figure 5:
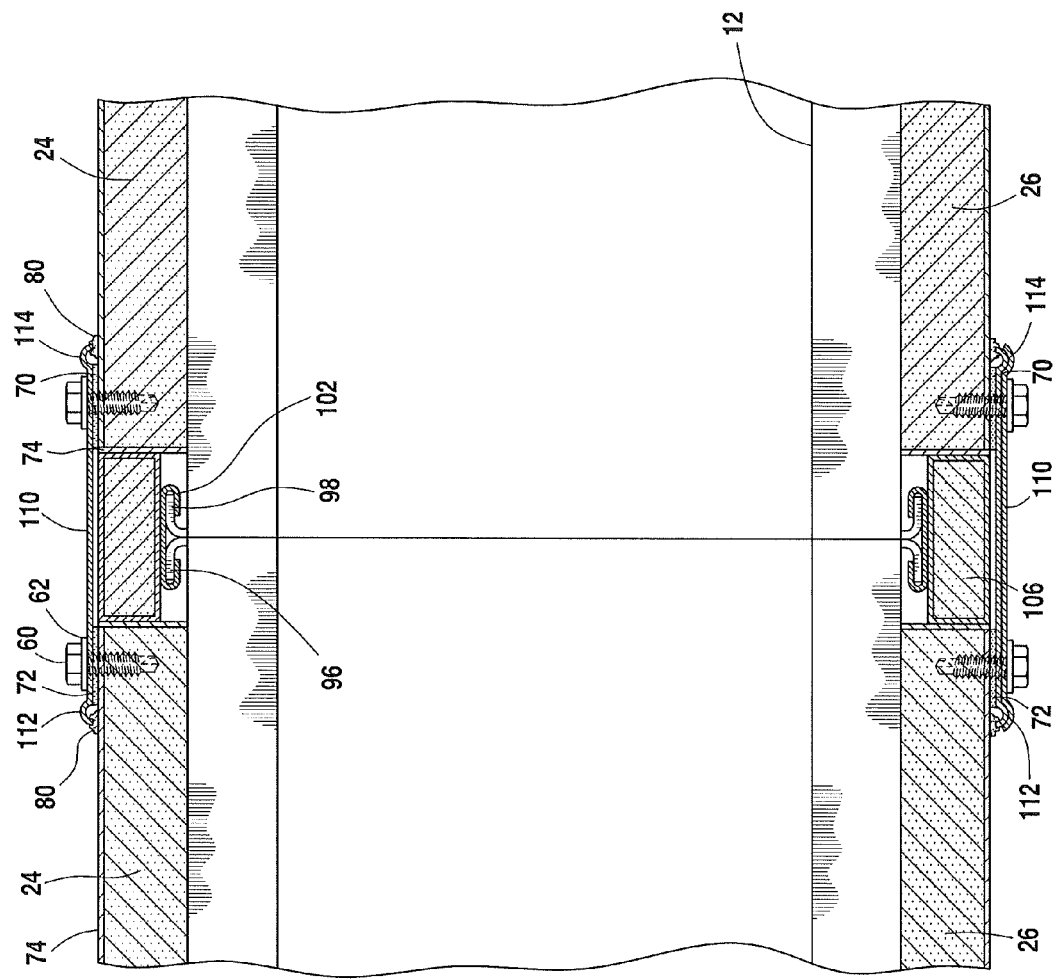
FIG. 5 shows a cross-sectional view taken along line 5-5 in FIG. 1.
Figure 6:
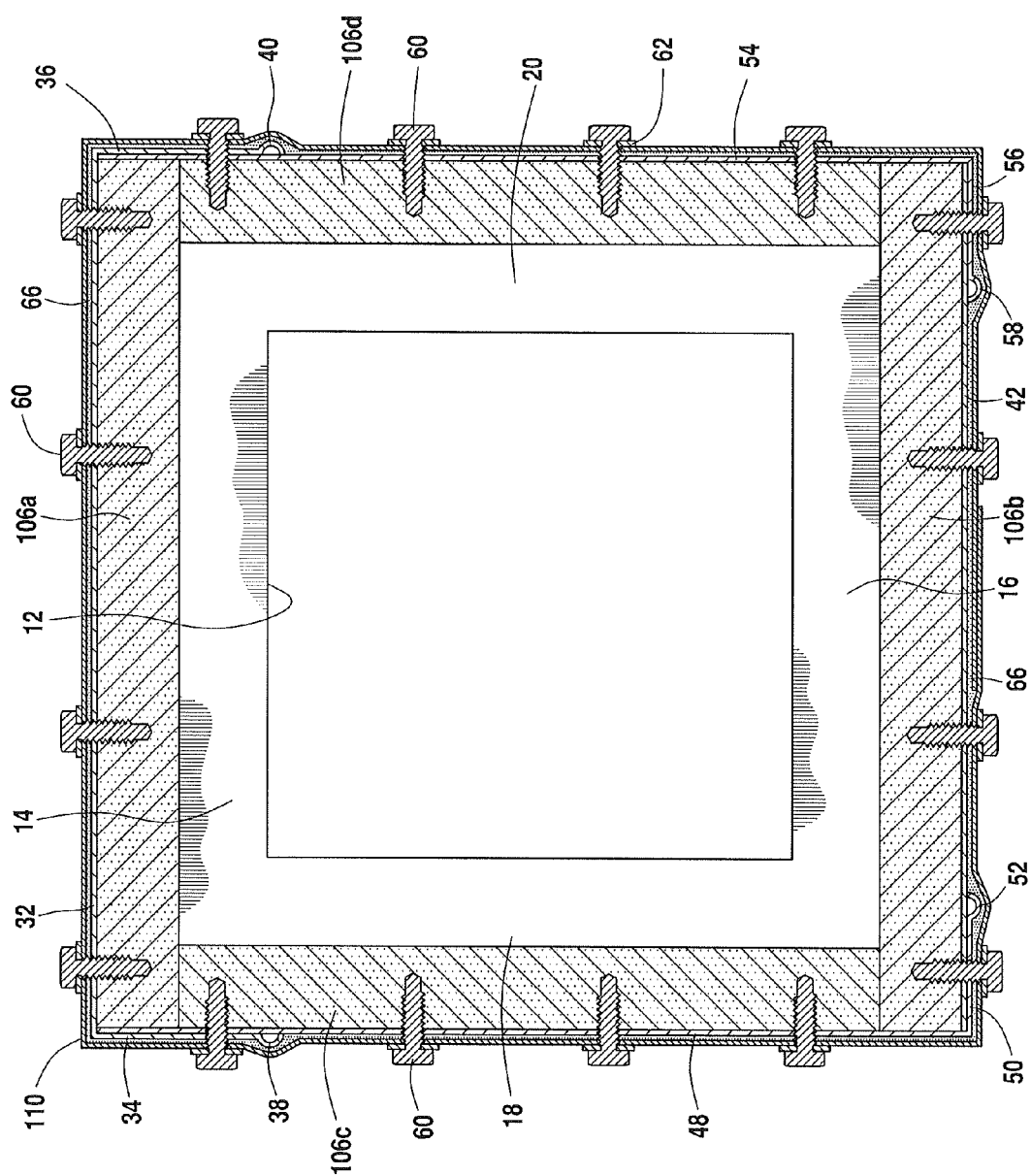
FIG. 6 shows a cross-sectional view taken along line 6-6 in FIG. 1.

Turning in detail to the drawings, FIGS. 1, 5 and 6 show two air circulation duct sections 10A and 10B joined together to form an air ductwork system passageway 100 for directing treated air in a heating, ventilation and/or air conditioning (HVAC) system. The air ductwork system passageway 100 may be used on both inside and outside installations. Each air circulation duct section 10A, 10B comprises an inner duct passage 12 having a top wall 14, bottom wall 16, sidewall 18 and sidewall 20. In this embodiment of the invention, the top wall 14, bottom wall 16, sidewall 18 and sidewall 20 are formed of an insulation material such as a foam insulation material disposed between two foil sheets. One representative insulation material is a foam panel branded Kool Duct® ducting system available from Kingspan Insulation Limited and PTM Manufacturing LLC. The air circulation duct sections 10, 10B of the air ductwork system passageway 100 have inner duct passageways of insulation material only, and without traditional metal ductwork.

Referring to FIGS. 5 and 6, the air circulation duct section 10B, inner duct passage 12 has a top wall 14, bottom wall 16, sidewall 18 and sidewall 20. The inner surfaces of these walls define the air passageway. The opposite surfaces of these walls are surrounded by solid insulation in the form of top layer 24, bottom layer 26, side layer 28 and side layer 30. In the embodiment shown, the layers 24, 26, 28 and 30 are joined to the opposite surfaces of walls 14, 16, 18 and 20 with a double-sided adhesive tape. One representative double-sided tape is 1.5 inch wide tape sold by Venture under designation 1163/74—T-766.

Referring now to FIG. 6, the layers 24, 26, 28 and 30 of solid insulation may have the same thickness and length, but may have different widths. In the embodiment shown in FIG. 6, the top layer 24 and bottom layer 26 have a longer width than the side layers 28, 30. Portions of the widths of the top layer 24 and bottom layer 26 thus extend beyond the width of the top wall 14 and bottom wall 16 respectively. These portions contact and overlap the side edges of the side layers 28, 30.

The solid insulation layers may be a suitable insulation board, such as insulation board with an R-6 or R-8 insulation rating value. The layers 24, 26, 28 and 30 may be of the same insulation rating, or of different insulation rating. In one embodiment, the solid insulation layers comprise KoolTherm® board available from PTM Manufacturing LLC with a thickness of 0.81 inch ($^{13}/_{16}$ inch) and an insulation rating of R-8. Optionally, the side edges and end edges of the solid insulation layers may be covered with a moisture barrier 74, such as a foil tape. One such tape is a 3-inch wide adhesive foil tape.

An external jacket may be formed over the solid insulation layers 24, 26, 28 and 30. The external jacket preferably comprises a material suitable to withstand weather effects of sunlight, rain, ice and snow. One suitable material for the jacket is a lightweight metal, such as aluminum. In one embodiment, the external jacket is formed with an aluminum metal sheet having a thickness of about 0.032 inch. Optionally, the aluminum metal sheet may be embossed to form a surface pattern therein.

In one embodiment, as shown in FIGS. 5 and 6, the external jacket comprises four jacket sections 32, 42, 48 and 54. First jacket 32 is joined to the top outer surface of top layer 24, such as with double-sided adhesive tape. First jacket 32 has a first right angle flange 34 at one side edge and a second right angle flange 36 and the opposite side edge. A first rib or channel 38 is formed in the first right angle flange 34. A second rib or channel 40 is formed in the second right angle flange 36.

Second jacket 42 is joined to the bottom outer surface of bottom layer 26, such as with double-sided adhesive tape. Second jacket as shown in FIG. 6 does not have any angled flanges at its side edges.

Third jacket 48 is joined to the outer surface of sidewall 28, such as with double-sided adhesive tape. Third jacket 48 has a right angle flange 50 at one side edge. In this embodiment, the opposite side edge of the third jacket 48 does not have an angled flange. A rib or channel 52 is formed in the right angle flange 50.

Fourth jacket 54 is joined to the outer surface of sidewall 30, such as with double-sided adhesive tape. Fourth jacket 54 has a right angle flange 56 at one side edge. In this embodiment, the opposite side edge of the fourth jacket 54 does not have an angled flange. A rib or channel 58 is formed in the right angle flange 56.

In one method, in a first step, the second jacket 42 is attached to the bottom layer 26 with double-sided adhesive tape. Then, in next steps, the third jacket 48 and fourth jacket 54 are attached to their respective sidewall layers 28, 30 with double-sided adhesive tape. The right angle flanges 50, 56 are positioned in overlapping relation over the side edges and a portion of the outer surface of second jacket 42. Lastly, the first jacket 32 is attached to the top layer 24 with double-sided adhesive tape. The right angle flanges 34, 36 of the first jacket 32 are positioned in overlapping relation over the side edges of the third jacket 48 and fourth jacket 54 respectively. A sealant or grout is applied to or placed inside the ribs or channels 38, 40, 52, 58 to join the edges of the external jacket sections to one another. The sealant or grout forms a barrier to restrict air and moisture from penetrating through the external jacket formed from first jacket 32, second jacket 42, third jacket 48 and fourth jacket 54 sections. Thus, the air circulation duct section 10 construction is weather-tight, making it suitable for outdoor use, as well as indoor use.

Two air circulation duct sections 10A, 10B are joined together at a joint to form an air duct system passageway 100. Referring now to FIGS. 2-5, two air circulation duct sections 10A, 10B are positioned in end to end relation for joining the ducts together. In a first step, shown in FIG. 3, slidably engageable sleeves 102, sometimes called bayonets, are inserted onto receiving flanges 96, 98 extending from end edges of the inner duct passages 12. The connection between the slidably engageable sleeves 102 and the flanges 96, 98 holds the ends of the air circulation duct sections 10A, 10B together in end to end relation whereby the air circulation system passageway is defined along the lengths of the air circulation duct sections 10A, 10B so joined. While just two air circulation duct sections 10A, 10B are shown in the Figures, it is contemplated that an air circulation passageway of any desired length may be formed by joining multiple air circulation duct sections together. An air duct passageway may include multiple air circulation duct sections joined together in series.

Figure 4:
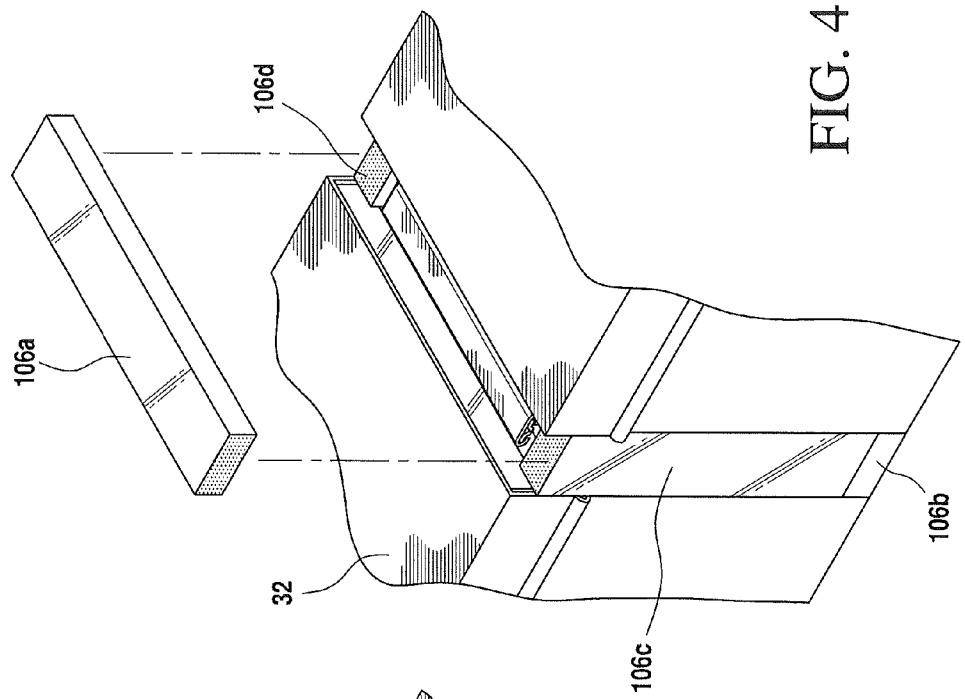
FIG. 4 shows a left front perspective view broken away showing the two air circulation duct sections according to FIGS. 2 and 3 in a second step of joining the two sections together.
Figure 3:
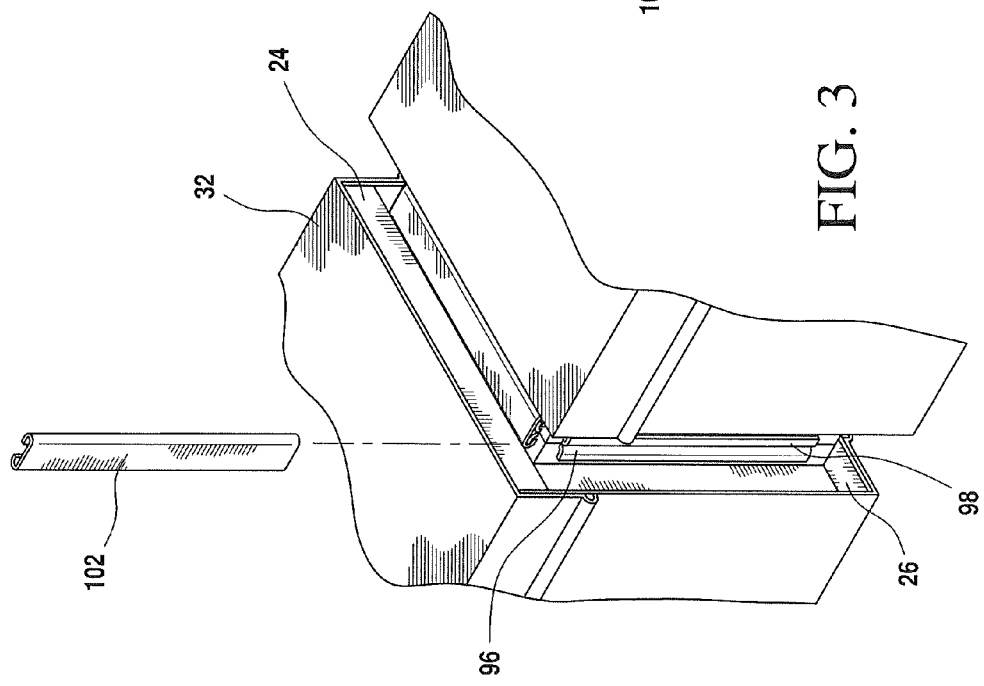
FIG. 3 shows a left front perspective view broken away showing the two air circulation duct sections according to FIG. 2 in a first step of joining the two sections together.

The joint openings between the air circulation duct sections 10A, 10B are next covered with sections of filler insulation 106. As shown in FIG. 4, the top layer of filler insulation 106a, and the bottom layer of filler insulation 106b, have longer lengths than the side layers of filler insulation 106c, 106d. Hence, the lengths of top layer and bottom layer of filler insulation 106a, 106b overlap the ends of the side layers of filler insulation 106c, 106d. In one embodiment, the filler insulation 106 may comprise KoolTherm® board with a thickness of 0.875 inch and an R6 insulation rating, or may comprise polyisocyanurate foam disposed between foil sheets with suitable thickness and insulation rating.

Referring now to FIG. 5, a closure band 110 encircles the joint and covers the filler insulation 106. The closure band 110 may be of a material suitable to withstand weather effects of sunlight, rain, ice and snow. One suitable material for the closure band 110 is a lightweight metal, such as aluminum. In one embodiment, the closure band is formed with an aluminum metal sheet having a thickness of about 0.032 inch. The closure band 110 in one preferred embodiment has a rib or channel 112, 114 formed along each side edge.

The closure band 110 is joined to the external jackets of air circulation duct sections 10A, 10B first with lengths of gasket tape 70, 72. The closure band 110 may be made in sections, such as 8 foot long sections, that have beads or grooves along each longitudinal side or near to each longitudinal side. The gasket tape may comprise a one inch wide butyl gasket tape pre-joined to the bottom surface of the closure band 110 and covered by release paper (not shown). Two lengths of gasket tape 70, 72 may be applied in substantially parallel relation along the length of the closure band, with one length of tape adjacent or near each longitudinal side of the closure band. As a first step, the release paper may be removed to expose the adhesive of the gasket tape for adhesively securing the closure band to the external jackets. In addition, the closure band 110 is joined to the external jackets of air circulation duct sections 10A, 10B with fasteners 60, 62, such as screws or bolts and seal washers. In one embodiment, the fasteners 60 are #10 stainless steel self-tapping screws (0.75 inch), and the washers 62 are weather seal washers, and the fasteners 60, 62 are placed on 6-inch centers around the full circumference of the duct system. In the embodiment shown in FIGS. 5 and 6, the fasteners 60 (screws) are positioned so as to penetrate through the butyl gasket tape 70, 72. Moreover, the closure band 110 is joined to the external jackets of air circulation duct sections 10A, 10B by applying a full bead of sealant or grout 80 along the side edges of the closure band 110 and into the ribs or channels 112, 114. The sealant or grout 80 extends around the full circumference of the duct system and forms a barrier to restrict moisture from penetrating through the closure band and the external jackets at the joint between air circulation duct sections 10A, 10B.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. An air circulation duct section, comprising:
    an inner duct air passageway formed with a first insulation material of foam insulation material disposed between metal foil sheets, said passageway having a top wall, a bottom wall and two opposed sidewalls;
    at least a first layer of solid insulation with insulation material disposed between metal foil sheets, said first layer having a top surface and an opposite surface, with its opposite surface joined to the top wall of the inner duct air passageway;
    a first jacket joined to the top surface of the first layer of solid insulation, said first jacket having at least one angled flange edge along its length;
    at least a second layer of solid insulation with insulation material disposed between metal foil sheets, said second layer having a top surface and an opposite surface, with its opposite surface joined to the bottom wall,
    a second jacket joined to the top surface of the second layer of solid insulation;
    at least a third layer of solid insulation with insulation material disposed between metal foil sheets, said third layer having a top surface and an opposite surface, with its opposite surface joined to one sidewall,
    a third jacket joined to the top surface of the third layer of solid insulation, said third jacket having at least one angled flange along its length;
    at least a fourth layer of solid insulation with insulation material disposed between metal foil sheets, said fourth layer having a top surface and an opposite surface, with its opposite surface joined to the other sidewall,
    a forth jacket joined to the top surface of the fourth layer of solid insulation, said fourth jacket having at least one angled flange along its length;
    wherein the angled flanges of the jackets overlap edges of adjacent jackets for attachment thereto, and
    wherein said jackets, insulation layers and inner duct air passageway together form the air circulation duct section.

2. The air circulation duct section of claim 1, further comprising fasteners to join angled flanges of the jackets to overlapped edges of adjacent jackets.

3. The air circulation duct section of claim 1, wherein the angled flanges define channels adapted to receive sealant or grout for joining the angled flanges of the jackets to overlapped edges of adjacent jackets.

4. The air circulation duct section of claim 3, further comprising sealant or grout held within the channels.

5. The air circulation duct section of claim 1, wherein the first, second, third and fourth jackets are formed of metal.

6. The air circulation duct section of claim 1, wherein the first layer of solid insulation comprises a first thermal insulating panel and a second thermal insulating panel adhered or laminated together.

7. The air circulation duct section of claim 1, wherein the inner duct air passageway is adapted to guide circulated air without metal ductwork forming any portion of the air circulation duct.

8. An insulated ductwork system, comprising: a first air circulation duct section according to claim 1 joined to a second air circulation duct section.

9. The insulated ductwork system of claim 8, wherein the first air circulation duct section is joined to the second air circulation duct section in end to end relation, with a joint between ends of the first air circulation duct section and the second air circulation duct section, and wherein the insulated ductwork system further comprises one or more layers of filler insulation disposed over the joint.

10. The insulated ductwork system of claim 9, further comprising a closure band disposed over the layer(s) of filler insulation and the joint.

11. The insulated ductwork of claim 10, further comprising adhesive tape to join the closure band to at least one of the jackets.

12. The insulated ductwork system of claim 11, further comprising sealant or grout to seal edges of the closure band to at least one of the jackets.

13. The insulated ductwork system of claim 11, further comprising sealant or grout to seal edges of the closure band to the first jacket, the second jacket, the third jacket and the fourth jacket.

14. The insulated ductwork system of claim 10, further comprising fasteners to join the closure band to at least one of the jackets.

15. A joint closure for air circulation duct sections of an insulated ductwork system, comprising:
    at least one receiving flange extending from an end of a first air circulation duct section, wherein the first air circulation duct section comprises
    an inner duct air passageway formed with a first insulation material of foam insulation material disposed between metal foil sheets having a top wall, a bottom wall and two opposed sidewalls;
    at least a first layer of solid insulation with insulation material disposed between metal foil sheets having a top surface and an opposite surface, with its opposite surface joined to the top wall of the inner duct air passageway;
    a first jacket joined to the top surface of the first layer of solid insulation, said first jacket having at least one angled flange edge along its length;
    at least a second layer of solid insulation with insulation material disposed between metal foil sheets having a top surface and an opposite surface, with its opposite surface joined to the bottom wall,
    a second jacket joined to the top surface of the second layer of solid insulation;
    at least a third layer of solid insulation with insulation material disposed between metal foil sheets having a top surface and an opposite surface, with its opposite surface joined to one sidewall, a third jacket joined to the top surface of the third layer of solid insulation, said third jacket having at least one angled flange along its length;

at least a fourth layer of solid insulation with insulation material disposed between metal foil sheets having a top surface and an opposite surface, with its opposite surface joined to the other sidewall, a fourth jacket joined to the top surface of the forth layer of solid insulation, said fourth jacket having at least one angled flange along its length;

wherein the angled flanges of the jackets overlap edges of adjacent jackets for attachment thereto, and wherein said jackets, insulation layers and inner duct air passageway together form the first air circulation duct section;

at least one receiving flange extending from an end of a second air circulation duct section;

at least one slidably engageable sleeve that engages the at least one flange of the first air circulation duct section and the at least one receiving flange of the second air circulation duct section to join the ends of the first air circulation duct section and the second air circulation duct section together in abutting end to end relation;

at least one filler insulation disposed over the at least one slidably engageable sleeve;

at least one closure band disposed over the at least one filler insulation; and tape, fasteners or sealant, or tape, fasteners and sealant in combination, to join the at least one closure band to the first air circulation duct section and to the second air circulation duct section.

16. The joint closure of claim 15, wherein the at least one closure band defines a rib or channel at or near its side edge that is adapted to receive sealant.

* * * * *